Feb. 10, 1959     C. L. MAMZIC     2,872,806
LEAK TESTING APPARATUS
Filed May 23, 1956
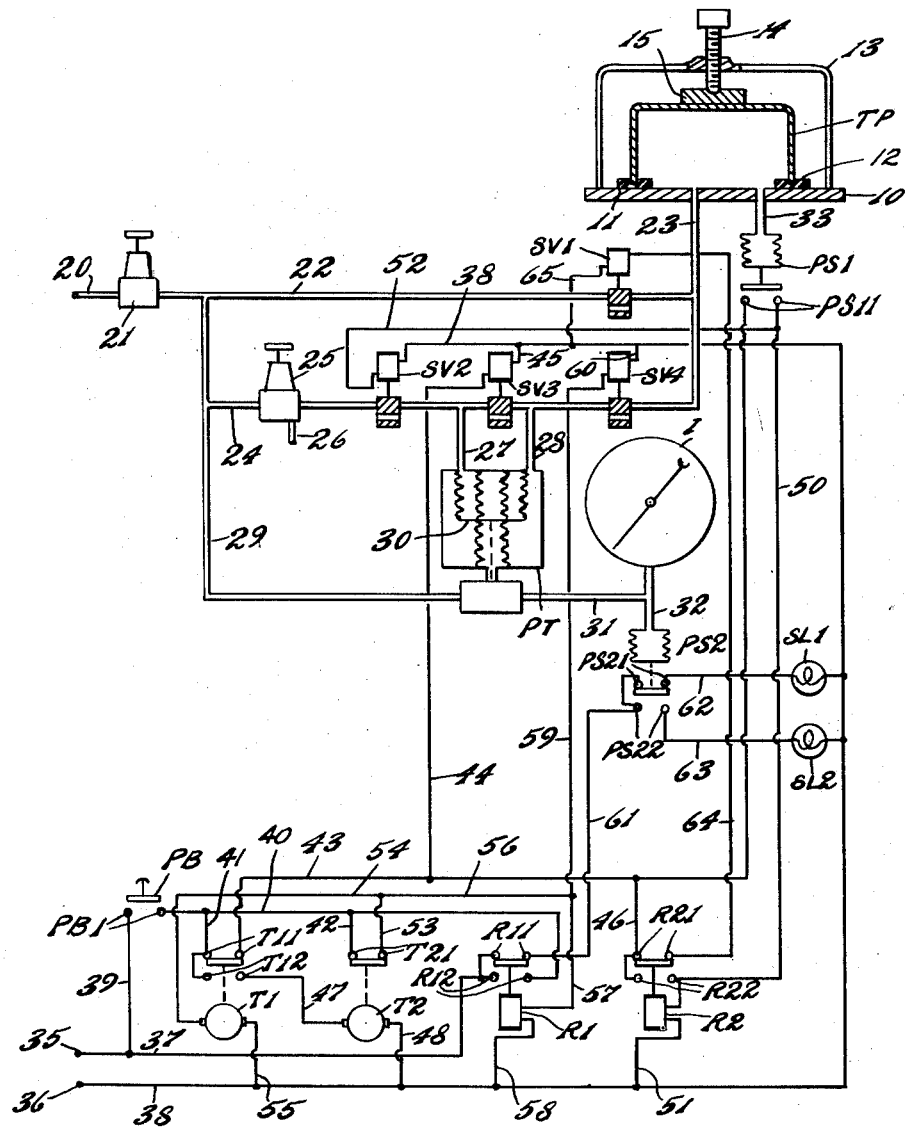
INVENTOR
Charles Louis Mamzic
BY
ATTORNEY

United States Patent Office 2,872,806
Patented Feb. 10, 1959

2,872,806

LEAK TESTING APPARATUS

Charles Louis Mamzic, Philadelphia, Pa., assignor to Moore Products Co., Philadelphia, Pa., a corporation of Pennsylvania Application May 23, 1956, Serial No. 586,789

7 Claims. (Cl. 73—40)

This invention relates to leak testing apparatus and more particularly to such apparatus in which fluid at pressures above atmospheric are employed.

It has heretofore been proposed to apply pressure fluid at pressures above atmospheric to a test piece to determine the leakage but the apparatus heretofore proposed has not proven wholly satisfactory.

Difficulty has been encountered both from the viewpoint of the speed of operation and of the accuracy of determination. One of the contributing factors is the elevation of temperature which occurs upon the compression of the pressure fluid in the space within the article to be tested.

In accordance with the present invention improved pressure leakage testing apparatus is provided which is more rapid in its action in the period preceeding the actual measurement of the leakage, so that the overall time of the test cycle is shortened.

In accordance with the present invention, improved pressure leakage testing apparatus is provided in which the necessity for a prolonged settling or cooling time as a part of the test cycle is eliminated.

In accordance with the present invention, improved pressure leakage testing apparatus is provided having a compensating action which can be increased or diminished as desired.

In accordance with the present invention, improved pressure leakage testing apparatus is provided having a pressure responsive control of the filling phase of the test cycle.

Other objects and advantageous features of the invention will be apparent from the specification and claims.

The nature and characteristic features of the invention will be more readily understood from the following description, taken in connection with the accompanying drawings forming part thereof, in which:

The figure is a simplified schematic diagram of pressure leak testing apparatus in accordance with the invention and showing the pneumatic components and the interconnection of the electrical components.

It should, of course, be understood that the description and drawings herein are illustrative merely, and that various modifications and changes can be made in the structure disclosed without departing from the spirit of the invention.

Referring now more particularly to the drawings, a test fixture is shown at 10 which may include a base plate 11, on which a gasket 12 is provided of suitable shape for the reception of a hollow work piece or test piece TP whose leakage is to be tested. The base plate 10 can have a yoke 13 secured thereto with a stud 14 and pressure plate 15 carried thereby for holding the test piece TP in position during the test cycle.

A fluid pressure connection 20 is provided, connected to any preferred source of fluid under pressure, filtered air being suitable. The fluid connection 20 is connected through a pressure regulator 21, and a fluid connection 22 to a fluid connection 23 which is in communication, through the base plate 11, with the interior of the test piece TP.

The pressure regulator 21 is set to deliver pressure fluid at a predetermined pressure level.

A solenoid operated valve SV1 is interposed in the fluid connection 22 for controlling the delivery of pressure fluid therethrough in timed relation, as hereinafter explained.

The fluid connection 22, on the supply side of the valve SV1, has a fluid connection 24 connected thereto which is connected in turn through a pressure regulator 25, and solenoid operated valves SV2, SV3 and SV4, disposed in series, to the fluid connection 23.

The pressure regulator 25 is set to deliver pressure fluid at a predetermined pressure level which is below that of the pressure fluid from the regulator 21, for purposes to be explained, and has a controlled relief port 26 for venting pressure on the output side of the regulator 25, in excess of the set pressure, to the atmosphere.

The fluid connection 24, between the valves SV2 and SV3, has a fluid connection 27 connected thereto, and between the valves SV3 and SV4 has a fluid connection 28 connected thereto.

A pressure transmitter PT for transmitting a pressure responsive to a differential of pressures applied thereto, by the fluid connections 27 and 28 is provided, and may be of any desired type. One suitable pressure transmitter is shown in the prior U. S. patent of C. B. Moore, No. 2,312,201.

The pressure transmitter PT has a supply connection 29 connected thereto in communication with the output of the pressure regulator 21. The pressure transmitter PT has a pressure responsive member 30 therein, responsive to the differential of the pressures supplied through the fluid connections 27 and 28 for supplying controlled pressure to a fluid connection 31. The fluid connection 31 is connected to any suitable visual indicator I, such as an indicating dial gauge, and has a fluid connection 32 connected to the pressure responsive portion of a pressure responsive switch PS2. The switch PS2 is responsive to an adjustable predetermined pressure level.

A fluid connection 33 is also provided, in communication with the interior of the test piece TP through the base plate 11, separate from the fluid connection 23, so as not to be subject to the pressure drop therein, and is connected to the pressure responsive portion of a pressure responsive switch PS1. The switch PS1 is responsive to an adjustable predetermined pressure level.

The electric circuit connections include power leads 35 and 36 which are connected to any suitable source of electric current supply. The power leads 35 and 36 respectively have conductors 37 and 38 connected thereto.

A control relay R1 is provided for effecting a holding action and has normally closed contacts R11 and normally open contacts R12, and a control relay R2 is provided, also for effecting a holding action, and has normally closed contacts R21 and normally open contacts R22.

An adjustable electric motor operated timer T1 is provided having normally closed contacts T11 and normally open contacts T12, and an adjustable electric motor operated timer T2 is provided having normally closed contacts T21.

A pressure responsive switch PS1 is provided having normally open contacts PS11 and a pressure responsive switch PS2 is provided having normally closed contacts PS21 and normally open contacts PS22.

In order to initiate controlled operation through a test cycle, a manually operable pushbutton PB is provided, having normally open contacts PB1. One of the contacts PB1 of the pushbutton PB is connected by a conductor 39 to the conductor 37, and the other of the contacts PB1 has a conductor 40 connected thereto which extends to one of the contacts R12 of the relay R1.

The conductor 40 has a conductor 41 connected thereto which extends to one of the normally closed contacts T11 of the timer T1 and to one of the normally open contacts T12 of the timer T1.

The conductor 40 has a conductor 42 connected to one of the contacts T21 of the timer T2.

A conductor 43 is provided which is connected to the other of the contacts T11 of the timer T1 and to one of the contacts PS11 of the switch PS1. The conductor 43 has a conductor 44 extending to one terminal of the winding of the solenoid of the valve SV3, the other terminal of the winding of the solenoid of the valve SV3 being connected by a conductor 45 to the conductor 38.

The conductor 43 also has a conductor 46 connected thereto which extends to one of the contacts R21 and to one of the contacts R22 of the relay R2.

A conductor 47 is provided connected to the other of the contacts T12 of the timer T1 and to one of the leads of the motor of the timer T2, the other lead of the motor of that timer being connected by a conductor 48 to the conductor 38.

The other of the contacts PS11 of the switch PS1 has a conductor 50 connected thereto which extends to the other of the contacts R22 of the relay R2 and from thence to one of the terminals of the winding of the solenoid of the relay R2. The other of the terminals of the latter winding is connected by a conductor 51 to the conductor 38.

The conductor 50 has a conductor 52 connected thereto which extends to one of the terminals of the winding of the solenoid of the valve SV2. The other of the terminals of the latter winding is connected to the conductor 38.

The other contact T21 of the timer T2 has a conductor 53 connected thereto which is connected by a conductor 54 to one of the leads of the motor of the timer T1, and a conductor 55 connects the other power lead of the motor of the timer T1 to the conductor 38. A conductor 56 connected to the junction of the conductors 53 and 54 is connected by a conductor 57 to one of the terminals of the winding of the relay R1, the other terminal of that winding being connected by a conductor 58 to the conductor 38. The junction of the conductors 56 and 57 is connected by a conductor 59 to one of the terminals of the winding of the valve SV4, the other terminal of that winding being connected by a conductor 60 to the conductor 38.

The other of the contacts R11 of the relay R1 is connected by a conductor 61 to one of the contacts PS22 and to one of the contacts PS21 of the pressure switch PS2.

The other of the contacts PS21 of the pressure switch PS2 is connected by a conductor 62 to the conductor 38, a visual signal, such as a signal lamp SL1, being interposed in the conductor 62.

The other of the contacts PS22 of the pressure switch PS2 is connected by a conductor 63 to the conductor 38, a visual signal, such as a signal lamp SL2, being interposed in the conductor 63.

The signal lamps SL1 and SL2 may be of any desired character but for purposes of indication are preferably green and red in color, respectively.

The other of the contacts R21 of the relay R2 is connected by a conductor 64 which extends to one of the terminals of the winding of the valve SV1, the other terminal of the winding being connected by a conductor 65 to the conductor 38.

The mode of operation will now be pointed out.

The test cycle preferably has four phases (1) fill, (2) equalize, (3) test, and (4) stand by, and these will be taken up in order.

Air under pressure is supplied through the fluid connection 20 and the output of the regulator 21 can be adjusted so that it is at any desired level, assumed for purposes of illustration as 60 p. s. i. The output of the regulator 25 can be adjusted to a lower predetermined level, assumed for purposes of illustration as 25 p. s. i.

Electric energy is supplied at the leads 35 and 36.

With a test piece TP in position on the gasket 12 and clamped by the stud 14 the test cycle can be initiated.

Upon momentary manual actuation of the pushbutton PB, a bypass circuit is set up through the contacts PB1 and through the normally closed contacts T21 of the timer T2 to energize the winding of the relay R1, thus opening the contacts R11 and closing the contacts R12. The closing of the contacts R12 sets up a holding circuit for the relay R1 which includes the normally closed contacts T21 of the timer T2. The opening of the contacts R11 deenergizes both the signal lamps SL1 and SL2.

The energization of the circuit which includes the winding of the relay R1 and the normally closed contacts T21 is also effective for actuating the solenoid valve SV4 to open position, energizing the motor of the timer T1, actuating the solenoid valve SV3 to open position through the normally closed contacts T11, and actuating the solenoid valve SV1 to open position through a circuit which includes the normally closed contacts R21.

With the valve SV1, in open position, pressure fluid from the output side of the regulator 21 surges into the interior of the test piece TP through the fluid connections 22 and 23. The air in the interior of the test piece TP will be heated above the ambient temperature because of its sudden compression and will be cooled by rapidly giving up heat to the walls of the test piece TP and the base plate 11 because of its higher temperature. When the pressure in the interior of the test piece reaches a predetermined level, above that available from the pressure regulator 25, and which may be 30 p. s. i., the switch PS1 closes the contacts PS11. This level is determined by the setting of the pressure switch PS1.

The closing of the contacts PS11 is effective to energize the winding of the relay R2 and closing of the contacts R22 attendant upon the energization of that winding establishes a holding circuit for the relay R2 through the contacts R22. At the same time, the winding of the valve SV1 is deenergized so that the valve SV1 closes. This terminates the fill phase of the cycle.

Upon the closing of the valve SV1, the pressure in the interior of the test piece TP is, for the pressure values previously stated, approximately 30 p. s. i. or 5 p. s. i. above the final test pressure as established by the pressure regulator 25.

An energizing circuit is also set up, at the same time, through the contacts R22, for energizing the winding of the valve SV2 to open that valve.

During the equalizing phase which now takes place, the valves SV2, SV3 and SV4 are open and a portion of the fluid in the test piece TP passes out through the fluid connection 23 and to the atmosphere through the bleed or relief port 26 of the pressure regulator 25 until the level reaches that delivered by the pressure regulator 25, whereupon further discharge will cease. The contacts PS11 will open as the pressure within the test piece TP drops but this will not have any effect because of the closed contacts R22.

As the pressure within the test piece TP drops from its upper level of 30 p. s. i. to the test level of 25 p. s. i. the fluid within the test piece TP expands and in so doing will further cool to the original delivered temperature. This further cooling is an energy exchange between the thermal and potential energy states, occurs very quickly within the fluid, and does not depend on heat exchange through the walls of the test piece TP or through the base plate 11, for bringing the temperature level of the fluid to equilibrium with the temperature of these walls.

By adjustment of the pressure setting of the pressure switch PS1, the final temperature attained upon reaching the test pressure can be brought to the ambient temperature level or can be increased or decreased with respect thereto, as desired.

The timer T1 is adjusted to permit sufficient time to elapse for the pressure in the interior of the test piece TP to reach equilibrium with the pressure from the regulator 25 and for all flow therebetween to cease. The timer T1 then operates to deenergize the windings of the valves SV2 and SV3 and of the relay R2. At the same time the motor of the timer T2 is energized to terminate the equalizing phase and initiate the test phase.

With the valves SV1, SV2 and SV3 closed, pressure is sealed in the fluid connection 27 and the expansible chamber to which it is connected, and will remain constant in its effect on the pressure responsive member 30. The pressure in the fluid connection 28 and the expansible chamber to which it is connected and effective on the pressure responsive member 30 will be determined by that in the interior of the test piece TP.

If there is no leakage from the interior of the test piece TP the pressure applied to the pressure responsive member 30 of the pressure transmitter PT, through the fluid connection 28, will remain constant.

If there is a leak from the interior of the test piece TP, a differential pressure will be effective on the pressure responsive member 30 so that pressure is transmitted by the pressure transmitter through the fluid connection 31 at the indicator I and at the pressure switch PS2. The increase of pressure from its initial value thus effective through the fluid connection 31 will be dependent on the rate of leakage and the duration of the test phase. The duration of the test phase is determined by the timer T2 which opens its contacts T21 in accordance with its time setting, thus deenergizing the relay R1 and the circuits controlled by its contacts R12. The contacts R11 are thus closed and a circuit is provided through the normally closed contacts R11 of the relay R1 and through the contacts PS21 or PS22 as determined by the pressure switch PS2. The particular signal light SL1 or SL2 which is illuminated will be determined by the amount of leakage during the test period, its effect in the pressure transmitter PT and whether the pressure thus transmitted is sufficient to actuate the pressure switch PS2. The characteristics of the test piece TP in terms of rate or amount of leakage during a selected time interval will thus be determined and indicated and from the indication it can be ascertained whether the test piece is acceptable or should be rejected. The test phase is thus terminated and the stand by phase initiated.

During the stand by phase all the solenoid valves SV1, SV2, SV3 and SV4 are closed. The pressure differential previously developed as a result of leakage will remain sealed within the pressure transmitter PT. The indicator I and the pressure switch PS2 are also held at positions corresponding to the previous leak rate.

The system will remain in this condition during the stand by phase while the operator removes the previously tested test piece TP.

The operator can insert another test piece TP and another test cycle can then be initiated by pushing the pushbutton PB as previously pointed out.

I claim:

1. Leak test apparatus comprising a work piece receiving member for a work piece having an opening, said member having a work piece engaging portion for sealing engagement at said opening, means for supplying filling pressure fluid at a predetermined pressure level to said member and interiorly of said work piece, means for supplying test pressure fluid at a different predetermined pressure level to said member, pressure sensitive means responsive to pressure changes at said member for controlling the supplying of pressure fluid by one of said supplying means, additional pressure sensitive means for controlling the other of said supplying means, and pressure responsive means responsive to the drop in pressure at said work piece receiving member due to leakage from the work piece.

2. Leak test apparatus as defined in claim 1 in which said first supplying means delivers pressure at a higher level than said second supplying means.

3. Leak testing apparatus comprising a work piece receiving member for a work piece having an opening, said member having a work piece engaging portion for sealing engagement at said opening, means for supplying filling pressure fluid at a predetermined pressure level to said member and interiorly of said work piece, said last means including devices for permitting a controlled pressure reduction at said member, means for sequentially supplying at a different predetermined level a test pressure in said member, and pressure responsive means responsive to the drop in pressure at said member due to leakage from the work piece.

4. Leak testing apparatus comprising a work piece receiving member for a work piece having an opening, said member having a work piece engaging portion for sealing engagement at said opening, means for supplying filling pressure fluid at a predetermined pressure level to said member and interiorly of said work piece, means for cutting off the flow of said filling fluid when the interior pressure in said work piece receiving member reaches a predetermined level below said first predetermined pressure, means for sequentially supplying a test pressure in said member at a predetermined pressure level lower than said first predetermined pressure level, and pressure responsive means responsive to the drop in pressure at said member due to leakage from the work piece.

5. Leak testing apparatus comprising a work piece receiving member for a work piece having an opening, said member having a work piece engaging portion for sealing engagement at said opening, a fluid connection to a source of fluid under pressure in communication with said member and interiorly of said portion and said work piece for the delivery of pressure fluid at a filling pressure, a control valve member for shutting off said fluid connection, a second fluid connection in communication with said first fluid connection and having a pressure regulating member therein for determining the test level pressure at said receiving member, a fluid pressure transmitter having a supply connection to a source of fluid under pressure and a pressure transmitting connection, said fluid pressure transmitter having a pressure responsive portion responsive to fluid upon separated parts thereof, control fluid connections from one of said fluid conections to said pressure transmitter, control valves in one of said fluid connections for controlling the application of the test pressure upon said separated parts and the pressure determined by leakage from the work piece upon one of said parts, a pressure responsive member responsive to the pressure at said receiving member for cutting off the pressure supplied through said first fluid connection, and additional pressure responsive means responsive to change of pressure upon leakage from said work piece.

6. Leak testing apparatus comprising a work piece receiving member for a work piece having an opening, said member having a work piece engaging portion for sealing engagement at said opening, a fluid connection to a source of fluid under pressure in communication with said member and interiorly of said portion and said work piece for the delivery of pressure fluid at a filling pressure, a control valve member for shutting off said fluid connection, a second fluid connection in communication with said first fluid connection and having a pressure regulating member therein for determining the test level pressure at said receiving member, a fluid pressure transmitter having a supply connection to a source of fluid under pressure and a pressure transmitting connection, said fluid pressure transmitter having a pressure responsive portion responsive to fluid upon separated parts thereof, control fluid connections from one of said fluid connections to said pressure transmitter, control valves in one of said fluid connections for controlling the application of the test pressure upon said separated parts and the pressure determined by leakage from the work piece upon one of said parts, a separate fluid connection in communication with the interior of said work piece, a pressure responsive member connected to said separate fluid connection and responsive to the pressure at said receiving member for cutting off the pressure supplied through said first fluid connection, and additional pressure responsive means responsive to change of pressure upon leakage from said work piece.

7. Leak testing apparatus comprising a work piece receiving member for a work piece having an opening, said member having a work piece engaging portion for sealing engagement at said opening, a fluid connection to a source of fluid under pressure in communication with said member and interiorly of said portion and said work piece for the delivery of pressure fluid at a filling pressure, a control valve member for shutting off said fluid connection, a second fluid connection in communication with said first fluid connection and having a pressure regulating member therein for determining the test level pressure at said receiving member, a fluid pressure transmitter having a supply connection to a source of fluid under pressure and a pressure transmitting connection, said fluid pressure transmitter having a pressure responsive portion responsive to fluid upon separated parts thereof, control fluid connections from one of said fluid connections to said pressure transmitter, control valves in one of said fluid connections for controlling the application of the test pressure upon said separated parts and the pressure determined by leakage from the work piece upon one of said parts, a pressure responsive member responsive to the pressure at said receiving member for cutting off the pressure supplied through said first fluid connection, additional pressure responsive means responsive to change of pressure upon leakage from said work piece, and timer controlled members for controlling said control valves.

References Cited in the file of this patent
UNITED STATES PATENTS

| | | |
|---|---|---|
| 2,472,973 | Hoffman et al. | June 14, 1949 |
| 2,573,053 | Pearlman | Oct. 30, 1951 |
| 2,633,739 | Potts et al. | Apr. 7, 1953 |